United States Patent
Chen

(10) Patent No.: US 7,033,851 B2
(45) Date of Patent: Apr. 25, 2006

(54) BUMP STRUCTURE OF A SCATTERING REFLECTIVE BOARD AND METHOD FOR MANUFACTURING THE BUMP STRUCTURE

(75) Inventor: Yi Fan Chen, Tainan (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 10/989,376

(22) Filed: Nov. 17, 2004

(65) Prior Publication Data

US 2005/0088592 A1    Apr. 28, 2005

Related U.S. Application Data

(62) Division of application No. 10/449,416, filed on Jun. 2, 2003, now Pat. No. 6,894,748.

(51) Int. Cl.
*H01L 21/00* (2006.01)
*G03C 5/00* (2006.01)

(52) U.S. Cl. .................. 438/29; 438/30; 428/323; 430/321; 430/325; 430/326; 430/330

(58) Field of Classification Search ............... 430/321, 430/325, 326, 330; 428/323; 349/113, 114, 349/130, 187; 359/67, 201, 449, 459, 559, 359/613; 438/29–30
See application file for complete search history.

(56) References Cited

U.S. PATENT DOCUMENTS

| 4,648,691 | A | * | 3/1987 | Oguchi et al. | 349/162 |
| 5,204,765 | A | * | 4/1993 | Mitsui et al. | 349/113 |
| 5,917,567 | A | * | 6/1999 | Oh et al. | 349/113 |
| 6,335,150 | B1 | * | 1/2002 | Tsai | 430/321 |
| 6,452,653 | B1 | * | 9/2002 | Yamanaka et al. | 349/113 |

* cited by examiner

*Primary Examiner*—Donghee Kang
(74) *Attorney, Agent, or Firm*—Rosenberg, Klein & Lee

(57) ABSTRACT

A method for manufacturing a bump structure includes depositing a layer of photosensitive material on a substrate. Next, multiple strip-shaped shielding sections are arranged on an optical mask at intervals and multiple irregularly arranged circular holes are distributed in the respective strip-shaped shielding sections. Multiple irregularly arranged circular shielding sections are distributed in spacing sections between the adjacent strip-shaped shielding sections and multiple irregularly arranged arch notches and arch shielding sections are distributed on the edges of the strip-shaped shielding sections. The photosensitive material layer is then exposed and developed to form bumps thereon and the heat is applied to solidify the surface of the bumps. Then a reflective film is laid on the substrate and the bumps to form a reflective board.

4 Claims, 6 Drawing Sheets

BUMP STRUCTURE OF A SCATTERING REFLECTIVE BOARD AND METHOD FOR MANUFACTURING THE BUMP STRUCTURE

This is a division of application Ser. No. 10/449,416, filed Jun. 2, 2003, now U.S. Pat. No. 6,894,748.

BACKGROUND OF THE INVENTION

The present invention is related to a bump structure of a scattering reflective board and a method for manufacturing the bump structure. The pattern of the optical mask is composed of multiple regularly arranged strips and multiple irregularly arranged circles. After exposed and developed, multiple scattering bumps are formed on the reflective board.

A conventional semi-reflective or reflective liquid display employs an internal reflective board to which a scattering film is externally attached. The environmental light will pass through the scattering film twice so that the reflectivity is lowered and the problem of aberration tends to take place.

In the case that the scattering film is made inside the liquid crystal display, that is, under the reflective layer, the problem of aberration can be avoided. After yellow light manufacturing procedure, the substrate is heated and inclined to make the bumps create reflow effect. Then the resin is twice painted. By means of many times of exposure and gray stair optical mask, asymmetric bump structures are achieved.

FIG. 4 shows a conventional method for manufacturing reflective board with bumps by way of reflow effect. A photoresistor layer 62 is painted on the substrate 61 and an optical mask is used for exposure and development to form multiple protuberances 621. Then the substrate 61 is inclined and heated. Thereafter, the protuberances 621 on the surface of the substrate 61 will be softened. Due to gravity, the softened photoresistor will flow downward to achieve a reflow effect and form asymmetrical arch shape. Finally, a metallic layer is fully deposited on the surfaces of the substrate 61 and the deformed protuberances 621 to form a reflective layer 64 with multiple asymmetrical protuberances 621. The reflective layer 64 serves to scatter and reflect the light by predetermined angle.

In the above manufacturing procedure of the reflective board, the photoresistor is etched by etching liquid. Actually, the etching depth is very small. Accordingly, in heat treatment, due to the reflow effect, the deformation amount of the downward flowing protuberances 621 will be very unapparent or even it is very hard to control the deformation amount within a predetermined range. As a result, the shape of the deformed protuberances 621 is hard to control.

FIG. 5 shows another conventional measure for manufacturing reflective board with bumps by means of parallelly moving, the optical mask and repeated exposure. A photoresistor 72 is painted on a substrate 71. Then, in yellow light manufacturing procedure, the optical mask 73 is parallelly moved to repeatedly expose the photoresistor 72. By means of many times of exposure, due to different exposure amounts, after developed, the photoresistor 72 is formed with stair-like protuberances 721. The substrate 71 with the stair-like protuberances 721 is heated to melt and dull the stair-like protuberances 721 so as to form an asymmetrical pattern. The surfaces of the asymmetrical protuberances 721 form bump structures of a scattering reflective board.

In the above measure, the stair-like protuberances 721 are formed by many times of exposure. The displacement of the optical mask between exposures is very small and hard to accurately control. Also, it is hard to accurately form the stair-like protuberances.

FIG. 6 shows still another conventional measure for manufacturing reflective board with bumps by means of gray stair optical mask exposure. According to this measure, it is necessary to first manufacture a gray stair optical mask 81 having multiple opaque portions 811, slightly transparent portions 812, semi-transparent portions 813 and fully transparent portions 814. After the photoresistor 83 painted on the substrate 82 is exposed, the different regions create different exposure amounts. Through the development, the region with more exposure amount has deeper development depth so as to form stair-like protuberances 831. Then the protuberances are heated and dulled to form the necessary bumps.

The gray stair optical mask is formed with regions with different exposure amounts. Actually, the bumps of the reflective board are very small and it is necessary to form the gray stair within a very small region. Therefore, it is very hard to manufacture the optical mask and the manufacturing cost is very high.

By means of all the above conventional measures, reflective boards with different patterns of scattering bumps can be manufactured. However, many problems exist in the conventional measures.

Besides, another problem exists in the conventional reflective board with scattering bumps. That is, the scattering bumps solve the aberration problem by means of enhancing the scattering (fogging) of the light. However, the enhanced scattering of the light will make it hard to concentrate the light. This will lead to insufficient brightness within visible angle range.

Therefore, it is necessary to provide an improved reflective board with scattering bump structures.

SUMMARY OF THE INVENTION

It is therefore a primary object of the present invention to provide a bump structure of a scattering reflective board and a method for manufacturing the bump structure. By means of setting the pattern of the optical mask, the manufacturing procedure can be such simplified that with one time of painting of the photoresistor and one time of exposure, regularly and irregularly arranged scattering bump structures can be manufactured. By means of the regularly arranged bumps, the brightness within the visible angle range can be enhanced. In addition, by means of the irregularly arranged scattering bumps, the aberration can be avoided.

According to the above object, the method for manufacturing the scattering reflective board includes steps of:

painting a layer of photosensitive material on a substrate, using an optical mask for exposure and development, the pattern of the optical mask being composed of multiple strips arranged at intervals and multiple irregularly arranged circles which are overlapped with each other, the optical mask having multiple strip-shaped shielding sections arranged at intervals, multiple irregularly arranged circular holes being distributed in the respective strip-shaped shielding sections, multiple irregularly arranged circular shielding sections being distributed in spacing sections between the adjacent strip-shaped shielding sections, multiple irregularly arranged arch notches and arch shielding sections being distributed on edges of the strip-shaped shielding sections, whereby the light can pass through the circular holes, arch notches and the spacing sections of the optical mask and be projected to the photosensitive material layer, after developed, multiple scattering bumps being formed on the photosensitive material layer;

heating the bumps formed on the photosensitive material layer to dull and solidify the surfaces of the bumps; and sequentially laying a reflective film and a protective film on the surfaces of the substrate and the scattering bumps to form the reflective board.

The bump structure of the scattering reflective board made by the above method includes multiple strip-shaped bumps arranged at intervals on a substrate, multiple circular holes irregularly distributed in the respective strip-shaped bumps, multiple circular bumps irregularly distributed between the adjacent strip-shaped bumps and multiple arch notches and arch bumps irregularly distributed on edges of the strip-shaped bumps. The regularly arranged strip-shaped bumps, irregularly arranged circular holes, circular bumps, arch notches and arch bumps form a scattering bump structure. A reflective film is laid on the surfaces of the substrate and the scattering bump structure to form the reflective board.

The present invention can be best understood through the following description and accompanying drawings wherein:

DETAILED DESCRIPTION OF THE PREFERRED EMBODIMENTS

Figure 1A:
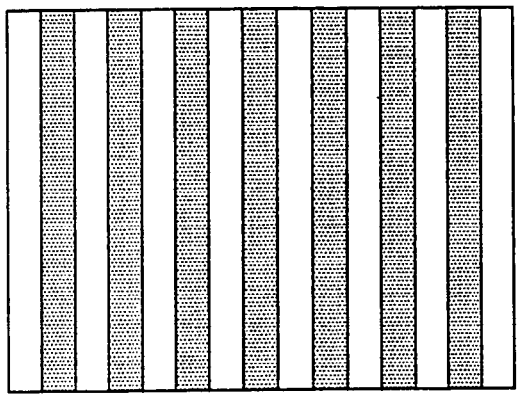
FIG. 1A is a view showing the strips of the pattern of the optical mask, which are arranged at intervals.
Figure 1B:
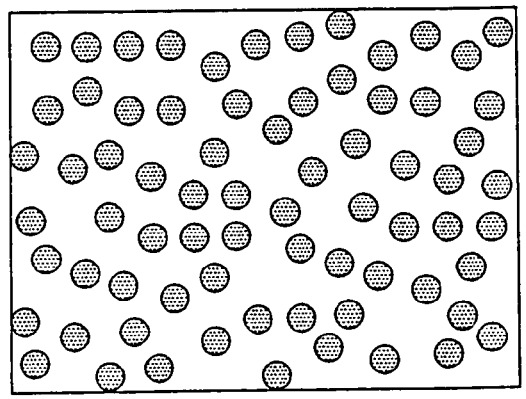
FIG. 1B is a view showing the irregularly arranged circles of the pattern of the optical mask.
Figure 1C:
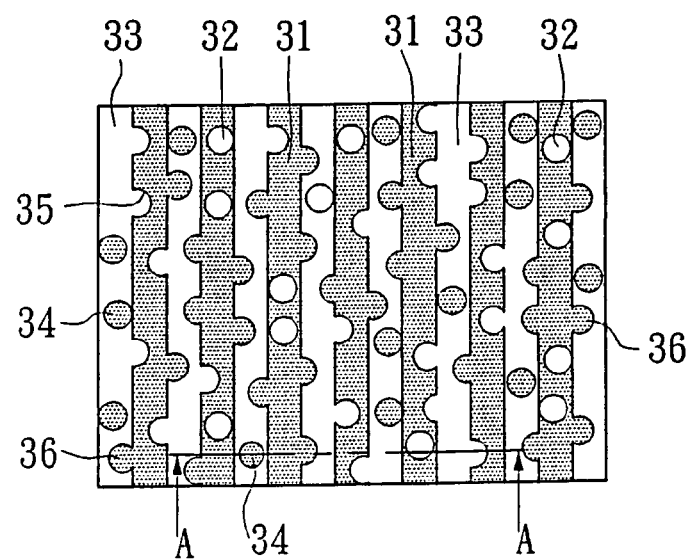
FIG. 1C shows the pattern of the optical mask of the present invention.
Figure 2:
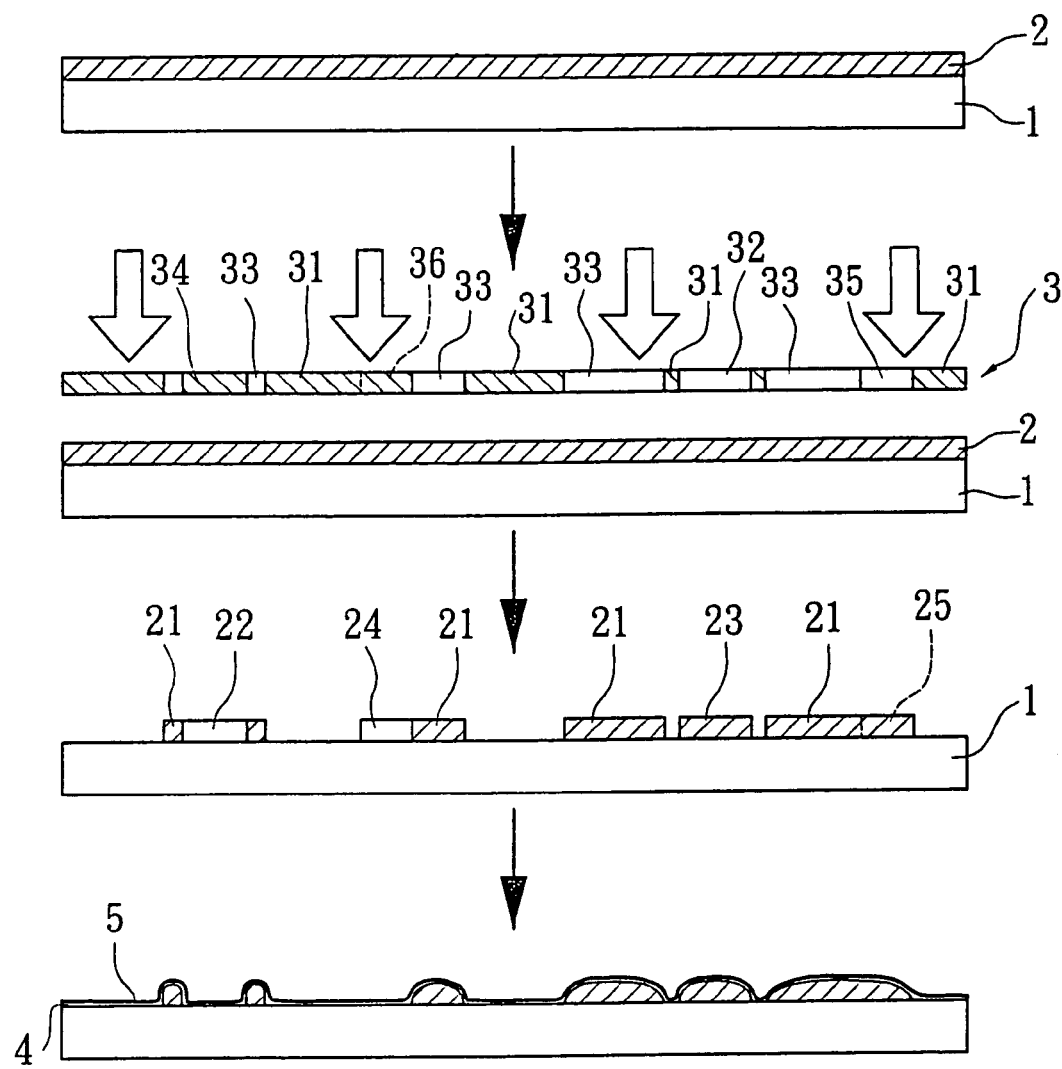
FIG. 2 is a flow chart of the manufacturing method of the present invention.

Please refer to FIGS. 1A to 2. The method for manufacturing the scattering reflective board of the present invention includes the steps of:

step 1: painting a layer of photosensitive material on a substrate 1;

step 2: using an optical mask 3 for exposure and development, the pattern of the optical mask 3 being composed of multiple strips arranged at intervals (as shown in FIG. 1A) and multiple irregularly arranged circles (as shown in FIG. 1B) which are overlapped with each other, the optical mask 3 having multiple strip-shaped shielding sections 31 arranged at intervals, multiple irregularly arranged circular holes 32 being distributed in the respective strip-shaped shielding sections 31, multiple irregularly arranged circular shielding sections 34 being distributed in the spacing sections 33 between the adjacent strip-shaped shielding sections 31, multiple irregularly arranged arch notches 35 and arch shielding sections 36 being distributed on the edges of the strip-shaped shielding sections 31, whereby the light can pass through the circular holes 32, arch notches 35 and the spacing sections 33 of the optical mask and be projected to the photosensitive material layer 2, after developed, multiple scattering bumps being formed on the photosensitive material layer 2;

step 3: heating the bumps formed on the photosensitive material layer 2 to dull and solidify the surfaces of the bumps the cross-section of which is arch-shaped; and step 4: sequentially laying a reflective film 4 and a protective film 5 on the surfaces of the substrate 1 and the scattering bumps to form the reflective board.

By means of setting the pattern of the optical mask, the manufacturing procedure can be such simplified that with one time of painting of the photoresistor and one time of exposure, regularly and irregularly arranged scattering bump structures can be manufactured. This solves the problems of difficulty in manufacturing the scattering reflective bumps and high cost existing in the prior art.

By means of the above method, the scattering reflective board is formed with scattering bumps. Multiple strip-shaped bumps 21 are arranged at intervals on the substrate 1. Multiple circular holes 22 are irregularly distributed in the respective strip-shaped bumps 21. Multiple circular bumps 23 are irregularly distributed between the adjacent strip-shaped bumps 21. Multiple arch notches 24 and arch bumps 25 are irregularly distributed on the edges of the strip-shaped bumps 21. The regularly arranged strip-shaped bumps 21, irregularly arranged circular holes 22, circular bumps 23, arch notches 24 and arch bumps 25 form the scattering bump structures.

After heated, the surfaces of the bumps are dulled and solidified to form the bump structures with arch-shaped cross-section. After the reflective film 4 and the protective film 5 are laid, the reflective film 4 and the protective film 5 are formed with corresponding protuberances and dents. Accordingly, the portions of the reflective film 4 corresponding to the regularly arranged strip-shaped bumps 21 can control the scattering angle of the light, whereby the scattering light can be concentrated within a visible angle range to enhance the brightness thereof. The portions of the reflective film 4 corresponding to the irregularly arranged circular bumps 23 and arch bumps 25 can enhance the scattering (fogging) of the light so as to destruct the aberration caused by the portions of the reflective film 4 corresponding to the regularly arranged strip-shaped bumps 21.

The scattering reflective board manufactured by the method of the present invention is applicable to the semi-penetrative liquid crystal display and reflective liquid crystal display.

In conclusion, by means of setting the pattern of the optical mask 3, the manufacturing procedure can be such simplified that with one time of painting of the photoresistor and one time of exposure, regularly and irregularly arranged scattering bump structures can be manufactured. Therefore, the cost is lowered. Moreover, the portions of the reflective film 4 corresponding to the regularly arranged strip-shaped bumps 21 can enhance the brightness of the visible angle range. In addition, by means of the portions of the reflective film 4 corresponding to the irregularly arranged circular bumps 23 and arch bumps 25, the aberration can be avoided.

Figure 3A:
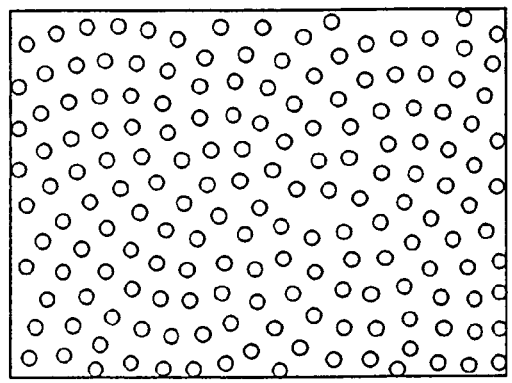
FIG. 3A is a view of a second embodiment of the present invention, showing that the circles of the pattern of the optical mask are irregularly arranged in Fibonacci series.
Figure 3B:
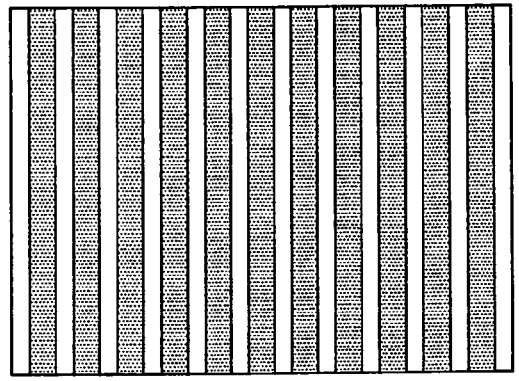
FIG. 3B is a view of the second embodiment of the present invention, showing that the strips of the pattern of the optical mask are arranged at intervals.
Figure 3C:
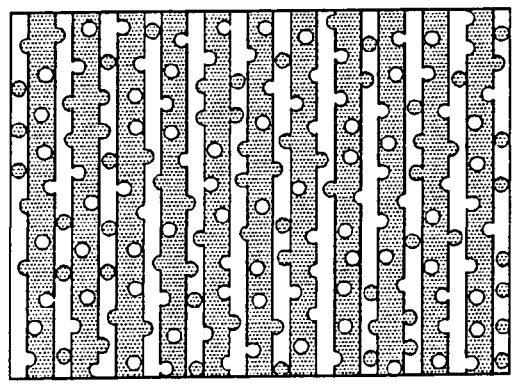
FIG. 3C shows the pattern of the optical mask of the second embodiment of the present invention.
Figure 4:
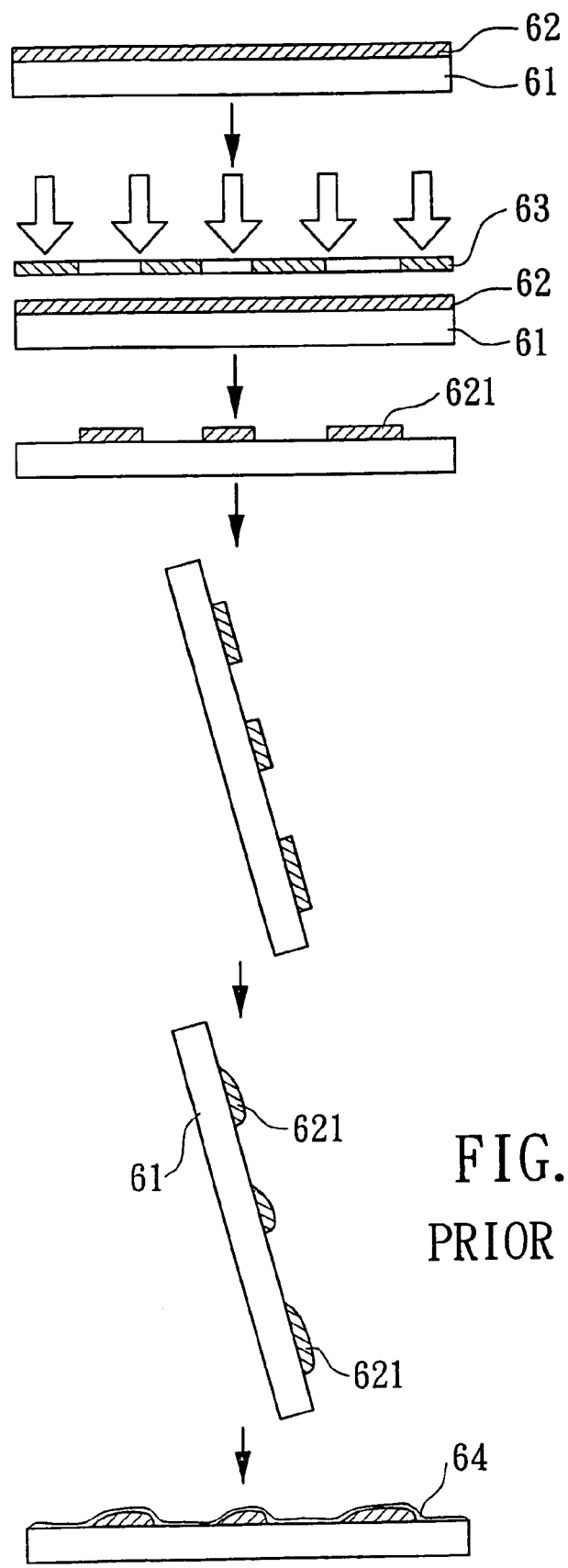
FIG. 4 is a flow chart of a conventional measure for manufacturing reflective board with bumps by way of reflow effect.
Figure 5:
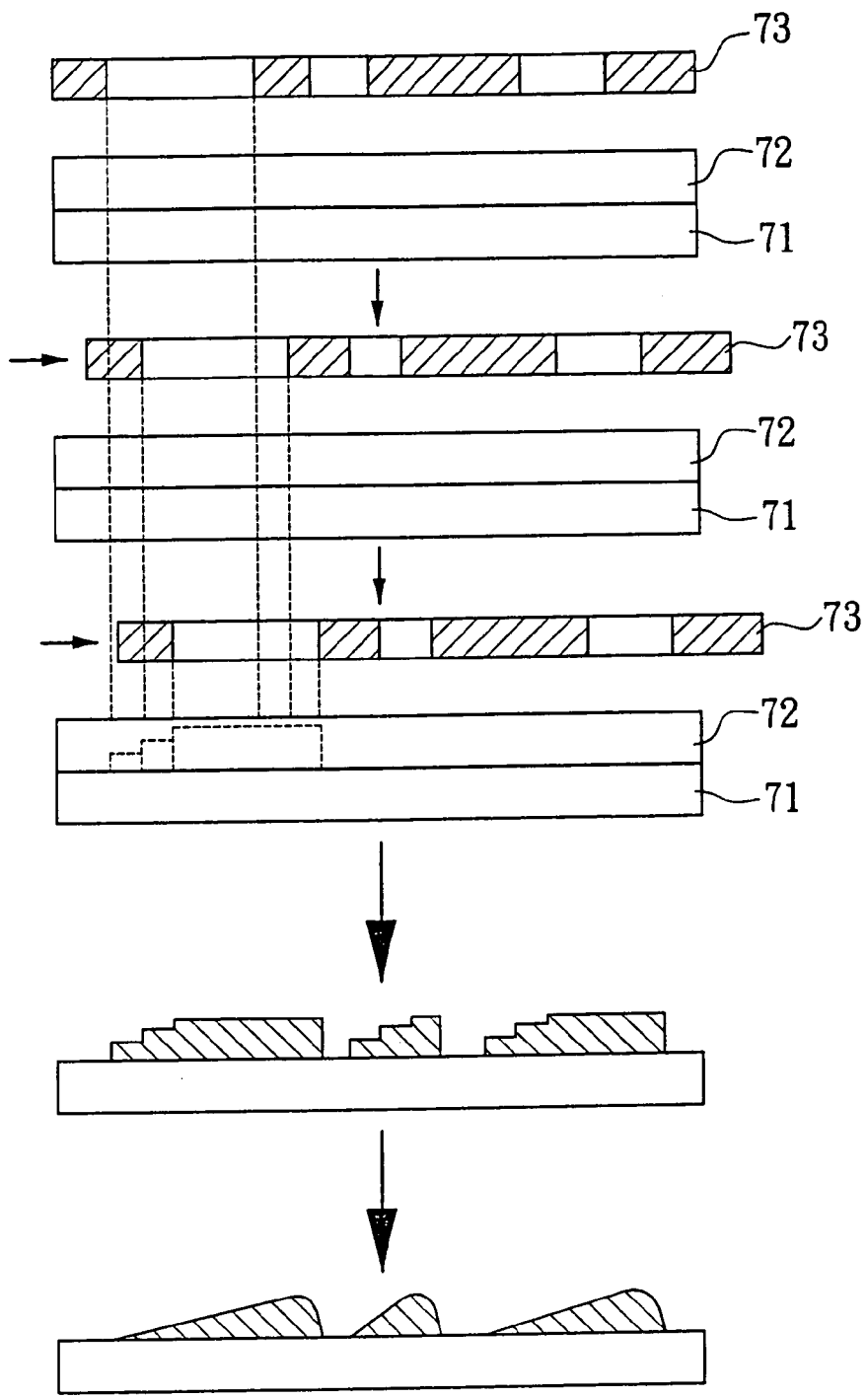
FIG. 5 is a flow chart of another conventional measure for manufacturing reflective board with bumps by means of parallelly moving the optical mask and repeated exposure.
Figure 6:
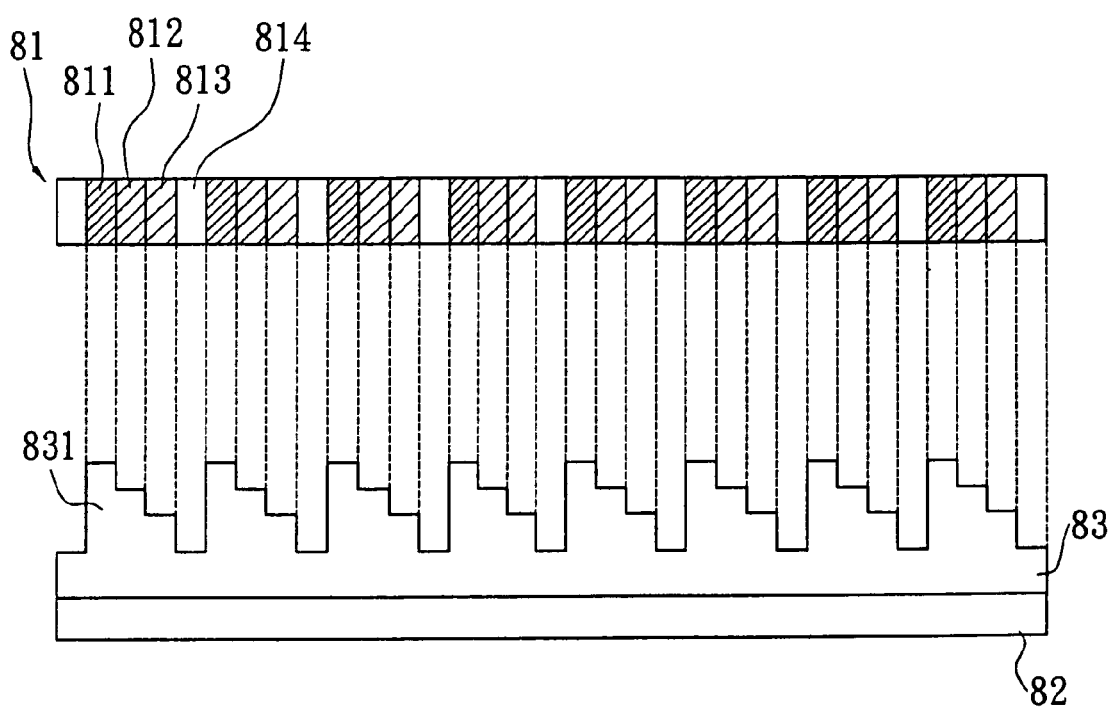
FIG. 6 is a flow chart of still another conventional measure for manufacturing reflective board with bumps by means of gray stair optical mask exposure.

The above embodiment is only used to illustrate the present invention, not intended to limit the scope thereof. Many modifications of the above embodiment can be made without departing from the spirit of the present invention. FIGS. 3A to 3C show a second embodiment of the present invention, in which the pattern of the optical mask is composed of multiple strips arranged at intervals (as shown in FIG. 3B) and multiple circles irregularly arranged in Fibonacci series (as shown in FIG. 3A) which are overlapped to form the pattern as shown in FIG. 3C. After exposed and developed, multiple circular holes, circular bumps, arch notches and arch bumps are formed and arranged on the substrate in Fibonacci series. This can achieve the same effect as the first embodiment.

What is claimed is:

1. A method for manufacturing a scattering reflective board, comprising steps of:

painting a layer of photosensitive material on a substrate:

using an optical mask for exposure and development, the pattern of the optical mask being composed of multiple strips arranged at intervals and multiple irregularly arranged circles which are overlapped with each other, the optical mask having multiple strip-shaped shielding sections arranged at intervals, multiple irregularly arranged circular holes being distributed in the respective strip-shaped shielding sections, multiple irregularly arranged circular shielding sections being distributed in spacing sections between the adjacent strip-shaped shielding sections, multiple irregularly arranged arch notches and arch shielding sections being distributed on edges of the strip-shaped shielding sections, whereby the light can pass through the circular holes, arch notches and the spacing sections of the optical mask and be projected to the photosensitive material layer, after developed, multiple scattering bumps being formed on the photosensitive material layer;

heating the bumps formed on the photosensitive material layer to dull and solidify the surfaces of the bumps; and sequentially laying a reflective film and a protective film on the surfaces of the substrate and the scattering bumps to form the reflective board.

2. The method as claimed in claim 1, wherein the material of the reflective film includes metal alloy, silver, gold, aluminum, copper, palladium and nonmetallic laminated film.

3. The method as claimed in claim 1, wherein the material of the protective film includes indium oxide, silicon dioxide and titanium dioxide.

4. The method as claimed in claim 1, wherein the circles are irregularly arranged on the optical mask in Fibonacci series.

* * * * *